US010075716B2

(12) United States Patent
Banerjee et al.

(10) Patent No.: US 10,075,716 B2
(45) Date of Patent: Sep. 11, 2018

(54) PARALLEL ENCODING OF WEIGHT REFINEMENT IN ASTC IMAGE PROCESSING ENCODERS

(71) Applicant: SAMSUNG ELECTRONICS CO., LTD., Suwon-si, Gyeonggi-do (KR)

(72) Inventors: Krishanu Banerjee, West Bengal (IN); Praveen Kumar Nelam, Karnataka (IN); Subramanian Parameswaran, Karnataka (IN); Srinivas Reddy Eregala, Telangana (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 323 days.

(21) Appl. No.: 15/135,072

(22) Filed: Apr. 21, 2016

(65) Prior Publication Data

US 2017/0310967 A1     Oct. 26, 2017

(51) Int. Cl.
*H04N 19/126* (2014.01)
*G06T 1/20* (2006.01)

(52) U.S. Cl.
CPC ............. *H04N 19/126* (2014.11); *G06T 1/20* (2013.01)

(58) Field of Classification Search
CPC ............ G06T 1/20; G06T 9/00; H04N 19/126
See application file for complete search history.

(56) References Cited

U.S. PATENT DOCUMENTS

| 5,204,920 | A | 4/1993 | Moran et al. |
| 6,157,743 | A | 12/2000 | Goris et al. |
| 7,606,435 | B1 | 10/2009 | Dumitras et al. |
| 7,885,469 | B2 | 2/2011 | Wang et al. |
| 2007/0018994 | A1 | 1/2007 | Sekine |
| 2008/0002895 | A1 | 1/2008 | Flavell et al. |
| 2009/0034612 | A1* | 2/2009 | Zheng .................. H04N 19/176 375/240.03 |
| 2013/0251036 | A1* | 9/2013 | Lee ...................... H04N 19/593 375/240.12 |
| 2016/0055658 | A1* | 2/2016 | Liang .................... G06T 11/006 382/131 |

\* cited by examiner

*Primary Examiner* — Edward Park
(74) *Attorney, Agent, or Firm* — F. Chau & Associates, LLC

(57) ABSTRACT

Embodiments herein provide a method of parallel encoding of weight refinement in an adaptive scalable texture compression (ASTC) encoder. The method includes determining whether a neighbor weight index for a weight index is available in a decimated weight grid. Further, the method includes refining the neighbor weight index and the weight index in parallel, in response to determining that the neighbor weight index is available for the weight index.

19 Claims, 9 Drawing Sheets

→ Weight indices sequence refined in parallel

⇠ Next weight index for refinement

•→ Weight indices considered for refining in parallel

PARALLEL ENCODING OF WEIGHT REFINEMENT IN ASTC IMAGE PROCESSING ENCODERS

TECHNICAL FIELD

The present inventive concept relates to Adaptive Scalable Texture Compression (ASTC) encoders, and more particularly relates to a method of providing parallel encoding of weight refinement in ASTC encoders.

DISCUSSION OF RELATED ART

Generally, in image compression, an uncompressed image is processed to obtain a compressed image. The processing of the uncompressed image includes application of one or more schemes to the uncompressed image. As an example, one such scheme for image compression is joint photographic experts group (JPEG), which standardized the algorithm.

One type of image is called a texture map or a texture. A texture map is an image that is applicable to a surface of a two-dimensional or three-dimensional object (for example, an object that is represented in a virtual space by a wireframe model that includes one or more polygons). Similar to images, texture maps are compressed using one or more image compression techniques to obtain compressed textures which are easily stored in a database or quickly communicated over a network. An Advanced Scalable Texture Compression (ASTC) is a standard compression algorithm developed by ARM Ltd. that is predominantly used for texture compression.

It is common in computer graphics systems to generate colors for sampling positions in an image to be displayed by applying textures or texture data to the surfaces to be drawn. For example, surface detail on objects may be generated by applying a predefined "texture" to a set of graphics primitives (such as polygons) representing the object, to give the rendered image of the object the appearance of the texture. Such textures are typically applied by storing an array of texture elements or "texels", each representing given texture data (such as color, luminance, and/or light/shadow values) at a given location (position), and then mapping the texels onto the corresponding elements, such as a set of sampling positions, for the image to be displayed. The stored arrays of texture elements (data) are typically referred to as texture maps.

Such arrangements can provide relatively high image quality, but have a number of drawbacks. In particular, the storage of the texture data and accessing it can lead to higher storage capacity and processing requirements on a graphics processing device. This is particularly significant for power-constrained devices, such as mobile phones and other hand-held devices that perform graphics processing, as these devices are inherently limited in their storage, bandwidth and power resources.

It is therefore known to encode such texture data in a compressed form so as to reduce the storage and bandwidth that may be imposed on a graphics processing device when using textures.

Texture compression techniques typically determine a reduced set or palette of colors (or other data) to be used for a given texture map, and then store, for each texture element (texel) in the texture map, an index into the set or palette of colors, which indicates the color to be used for the texture element. This has the advantage that only an index (rather than a full color), value needs to be stored for each texel.

Existing texture compression techniques use block-based encoding in which the overall array of texture elements to be encoded is divided into an array of small blocks (such as blocks of 4×4 texels or 8×8 texels), with each such block then encoded (compressed), and decoded, separately. This can help to make the decoding process more efficient, because the decoder, for example, may need to decode only one or a few of the encoded blocks to determine the value of a texel of interest, rather than the entire encoded texture.

In conventional ASTC encoders, a weight refinement algorithm runs in a single core engine. Weights in a decimated grid array are refined sequentially in a raster scan order. For example, to refine a weight index, the refinement of a preceding index to the weight index should be completed. To refine a next weight index, the refinement of preceding indices must be completed. Thus, in existing ASTC encoders, complete refinement of each weight index cannot be executed in a single clock cycle in a hardware system or hardware accelerator. Thus, the weight refinement algorithm running in the single engine core cannot provide real-time performance.

The above information is presented as background information, only, to help the reader to understand the present inventive concept. Applicants have made no determination, and make no assertion, as to whether any of the above might be applicable as prior art with regard to the present application.

SUMMARY

Exemplary embodiments of the present inventive concept offer a method of providing parallel parallel encoding of weight refinement in an adaptive scalable texture compression (ASTC) encoder. An exemplary method includes determining, by a weight refinement unit, whether a neighbor weight index for a weight index is available in a decimated weight grid. Further, the method includes refining, by the weight refinement unit, the neighbor weight index and the weight index in parallel, in response to determining that the neighbor weight index is available for the weight index.

An exemplary embodiment method of providing parallel encoding of weight refinement in an adaptive scalable texture compression (ASTC) encoder includes: determining whether a neighbor weight index is available for a weight index in a decimated weight grid; and in response to determining that said neighbor weight index is available for said weight index, refining said neighbor weight index and said weight index in parallel.

The exemplary embodiment method may provide that said determining and said refining are performed by a weight refinement unit.

The exemplary embodiment method may provide that refining said neighbor weight index and said weight index in parallel comprises: generating a weight indices sequence with said neighbor weight index and said weight index.

The exemplary embodiment method may further include: storing the weight indices sequence in at least one of a look-up table or a buffer.

The exemplary embodiment method may provide that said determining includes: identifying said neighbor weight index based on at least one position relative to said weight index within the decimated weight grid.

The exemplary embodiment method may provide that said at least one position is located on a top left, top right, bottom left, or bottom right of said weight index within the decimated weight grid.

The exemplary embodiment method may provide that said neighbor weight index at said position within the decimated weight grid is refined in parallel with said weight index.

An exemplary embodiment Advanced Scalable Texture Compression (ASTC) encoder for parallel encoding of weight refinement includes a weight refinement unit configured for: determining whether a neighbor weight index is available for a weight index in a decimated weight grid; and in response to determining that said neighbor weight index is available for said weight index, refining said neighbor weight index and said weight index in parallel.

The exemplary embodiment ASTC encoder may include a weight refinement unit configured to refine said neighbor weight index and said weight index in parallel by generating a weight indices sequence with said neighbor weight index and said weight index.

The exemplary embodiment ASTC encoder may include a storage unit comprising at least one of a look-up table or a buffer configured for storing the weight indices sequence.

The exemplary embodiment ASTC encoder may include a unit for determining configured for identifying said neighbor weight index based on at least one position relative to said weight index within the decimated weight grid.

The exemplary embodiment ASTC encoder may be configured so said at least one position is located on a top left, top right, bottom left, or bottom right of said weight index within the decimated weight grid.

The exemplary embodiment ASTC encoder may be configured so said neighbor weight index at said position within the decimated weight grid is refined in parallel with said weight index.

An exemplary embodiment computer program product includes computer-executable program code recorded on a computer-readable non-transitory storage medium, said computer-executable program code when executed causing the actions including: determining whether a neighbor weight index is available for a weight index in a decimated weight grid; and in response to determining that said neighbor weight index is available for said weight index, refining said neighbor weight index and said weight index in parallel.

The exemplary embodiment computer program product may cause said determining and said refining to be performed by a weight refinement unit.

The exemplary embodiment computer program product may cause refining said neighbor weight index and said weight index in parallel including: generating a weight indices sequence with said neighbor weight index and said weight index.

The exemplary embodiment computer program product may include computer-executable program code for storing the weight indices sequence in at least one of a look-up table or a buffer.

The exemplary embodiment computer program product may cause determining comprising identifying said neighbor weight index based on at least one position relative to said weight index within the decimated weight grid.

The exemplary embodiment computer program product may use said at least one position located on a top left, top right, bottom left, or bottom right of said weight index within the decimated weight grid.

The exemplary embodiment computer program product may cause said neighbor weight index at said position within the decimated weight grid to be refined in parallel with said weight index.

Accordingly, exemplary embodiments herein provide an Adaptive Scalable Texture Compression (ASTC) encoder for parallel encoding of weight refinement. The ASTC encoder includes a weight refinement unit configured to determine whether a neighbor weight index for a weight index is available in a decimated weight grid. Further, the weight refinement unit is configured to refine the neighbor weight index and the weight index in parallel, in response to determining that the neighbor weight index is available for the weight index.

Accordingly, exemplary embodiments herein provide a computer program product comprising computer-executable program code recorded on a computer readable non-transitory storage medium. The computer-executable program code, when executed, causing actions including determining whether a neighbor weight index for a weight index is available in a decimated weight grid. The computer-executable program code, when executed, causing actions including refining the neighbor weight index and the weight index in parallel, in response to determining that the neighbor weight index is available for the weight index.

These and other aspects of exemplary embodiments disclosed herein will be better appreciated and understood when considered in conjunction with the following description and the accompanying drawings. It should be understood, however, that the following description, while indicating exemplary embodiments and numerous specific details thereof, is given by way of illustration and not of limitation. Many changes and modifications may be made within the scope of the exemplary embodiments herein without departing from the scope or spirit thereof, and the present inventive concept includes all such modifications.

BRIEF DESCRIPTION OF THE DRAWINGS

This present inventive concept is illustrated by way of non-limiting example in the accompanying drawings, throughout which like reference indicia may indicate corresponding parts in the various figures. The exemplary embodiments herein will be better understood from the following description with reference to the drawings, in which.

DETAILED DESCRIPTION

Figure 1:
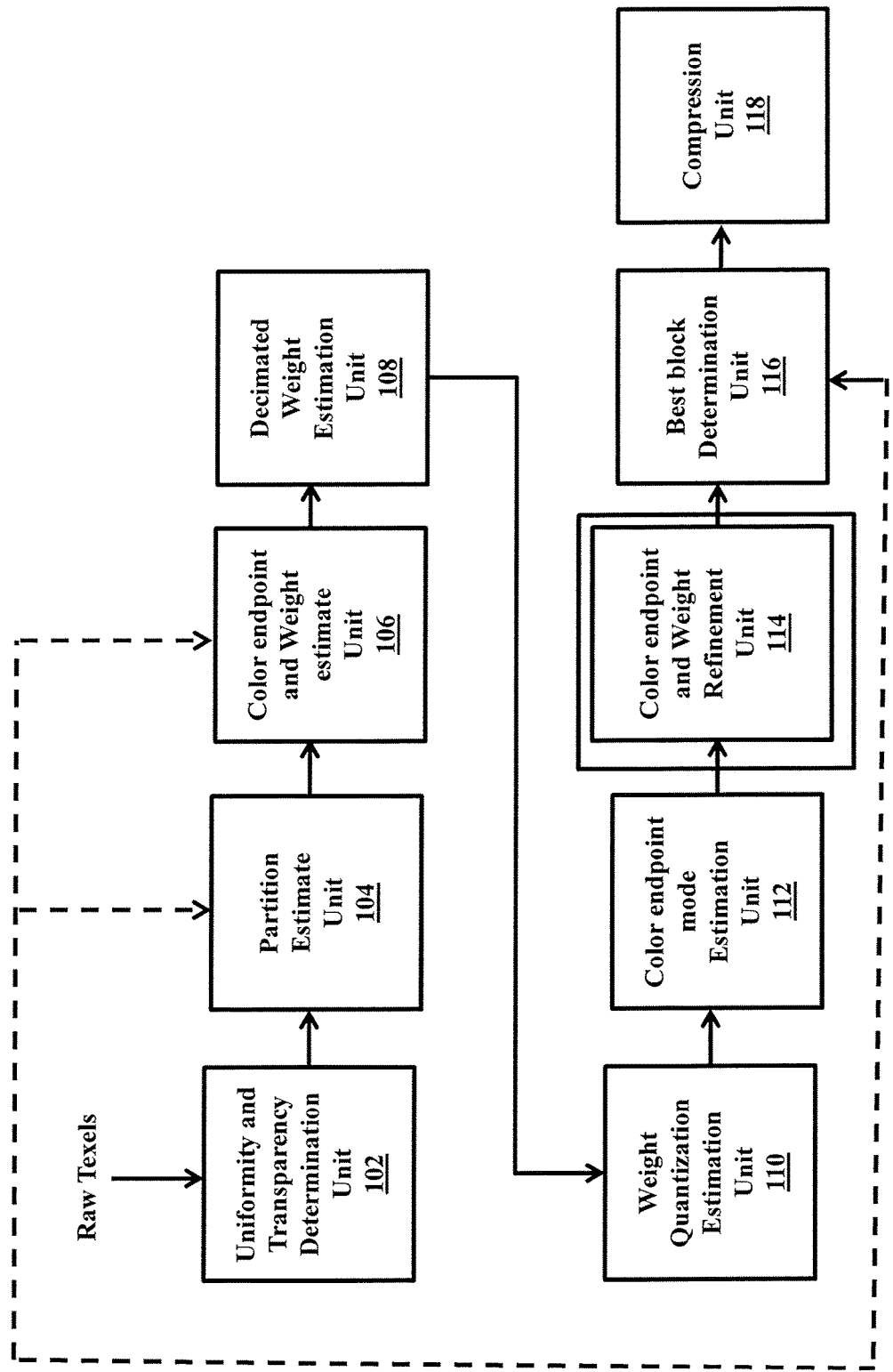
FIG. 1 is a schematic block diagram of an adaptive scalable texture compression (ASTC) encoder for providing parallel encoding of weight refinement according to an exemplary embodiment of the present inventive concept.

The present inventive concept and the various features and details thereof are explained more fully with reference to non-limiting exemplary embodiments that are illustrated in the accompanying drawings and described in the following description. Descriptions of well-known components and processing techniques may be omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice embodiments of the present inventive concept. Accordingly, the examples should not be construed as limiting the scope of the exemplary description herein.

The exemplary embodiments described herein achieve a method of providing parallel encoding of weight refinement in an adaptive scalable texture compression (ASTC) encoder. The method includes determining whether a neighbor weight index is available for a weight index in a decimated weight grid. For example, the neighbor weight index is identified based on positions such as top left, top right, bottom left and bottom right of the neighbor weight index. In order to identify the neighbor weight index for the weight index, initially the weight indices which are located on top left, top right or the bottom left may be refined. If it is identified that the top left, top right or the bottom left weight indices are refined then, for the weight index, the neighbor weight index can be identified.

Further, the method includes refining, by the weight refinement unit, the neighbor weight index and the weight index in parallel, in response to determining that the neighbor weight index is available for the weight index.

In an exemplary embodiment, the method includes generating a weight indices sequence with the neighbor weight index and the weight index. In an exemplary embodiment, the weight indices sequence is stored in a look-up table or a buffer.

Unlike the conventional method of weight refinement, method of the present inventive concept can be used to refine the weight index and the neighbor weight index in parallel. The present method can be used to analyze the decimated weight grid size for generating the weight indices sequence in which some weight indices are indexed in sequence and some weight indices are refined in parallel. In the present method, the weight refinement can be performed using a single core engine, where the weight indices are channelized or sequenced to the single core engine to achieve higher throughput. When the weight indices are sequenced or channelized to the single core engine, cycle gap between neighbor weight indices can be optimized with the present method. Thus, the weight indices are derived and the derived weight indices are sequenced to the single core engine using the present method.

Unlike conventional systems where Zig-Zag ordering of weight refinement is performed, the present method improves the throughput by refining the weight indices and the neighbor weight indices in parallel.

The weight indices sequencing within hardware pipeline stages deploying one single core for a given decimated weight grid array may involve the following steps as described herein; (a) with a single weight index refine engine having "n" stages in hardware pipeline, there will be a queue of length "n", which comprises the indexes, which, in turn, are refined in each corresponding hardware stage; (b) for each weight index, there are another four indices to be processed before a new index is pushed to the channel; (c) a next index to be refined is decided in the first hardware stage, which before pushing the decided weight index to the channel, checks the weight indices sequence about which all indices are refined currently; (d) if a dependent weight neighbor index in the queue is found to be refining, the dependent weight index waits until it comes out of the queue. Thus, there comes a gap between two indices in processing, which can vary between 'n' to one cycle.

Referring now to FIGS. 1 through 6 where similar reference characters may denote corresponding features throughout the figures, exemplary embodiments are shown.

FIG. 1 illustrates an Adaptive Scalable Texture Compression (ASTC) encoder for providing a parallel encoding of weight refinement according to an exemplary embodiment as disclosed herein. As depicted in FIG. 1, the ASTC encoder 100 includes a uniformity and transparency determination unit 102, a partition estimation unit 104 connected to the uniformity and transparency determination unit, a color endpoint and weight estimation unit 106 connected to partition estimation unit, a decimated weight estimation unit 108 connected to the color endpoint and weight estimation unit, a weight quantization estimation unit 110 connected to the decimated weight estimation unit, a color endpoint mode estimation unit 112 connected to the weight quantization estimation unit, a color endpoint and weight refinement unit 114 connected to the color endpoint mode estimation unit, a best block determination unit 116 connected to the color endpoint and weight refinement unit, and a compression unit 118 connected to the best block determination unit.

Raw image data such as a texture map is provided as an input to the uniformity and transparency determination unit 102. The uniformity and transparency determination unit 102 checks for uniformity of texels in the raw image data.

The partition estimation unit 104 identifies a best partition pattern for a given block foot-print. There may be a maximum of 1024 predefined partition patterns for a given block foot-print as specified in the ASTC standard.

The partition estimation unit 104 initially checks for uniformity of texels. If all components are with constant color, then the partition estimation unit 104 sets an IsVoidExtent flag to ON. Further, the partition estimation unit 104 may bypass some or all of the intervening units to encode the block as a void extent block in the compression unit 118.

If the IsVoidExtent flag is zero, then the partition estimation unit 104 applies a K-Mean clustering algorithm to group block texels into different partitions. Then, the extracted partition pattern from K-means clustering is compared to pre-defined partition patterns to select 'N' number of best partition patterns. Finally, the partition estimation unit 104 selects the partition pattern with the least partition error.

The color endpoint and weight estimation unit 106 selects a block mode for encoding. The texture map is divided into blocks of size, for example 16×16, 8×8, 4×4 or the like. The selected block mode for encoding is known as the coded block. For each partition of texels, the color endpoint and weight estimation unit 106 computes ideal color end points and texel weights.

Further, the ASTC encoder 100 iteratively checks for all combinations of weight grid sizes, weight quantization levels, color end point modes and color end point quantization levels to select a best combination of decimated weight grid, weight quantization level, color end point mode and color end point quantization level. The selection criteria is based on the compressed information of a selected combination which fits into fixed 128-bit with the best possible quality out of all combinations for each block.

In an embodiment, the decimated weight estimate module 106 obtains a decimate weight estimate for the selected block mode. In an example, when the color endpoint and weight estimate module 104 selects an 8×8 block for encoding, then the decimate weight estimate module 106 can be configured to obtain the decimated weight estimate as a 5×6 block. The decimated weight estimate 5×6 block is a subset of the 8×8 block.

In one system, the weight refinement process in the ASTC encoder is as described herein. The weights are aligned to quantized endpoint values using the various steps as detailed herein, including: (a) reconstruct color weight ($W_{00}$, $W_0$ . . . ) from un-quantized decimated weights ($dw_{00}$, $dw_{01}$ . . . ) using weight in-fill process; (b) reconstruct all color texels (O) by interpolating using unquantized reconstructed weights and un-quantized color end-points (e.g., ep0 and ep1); (c) compute color error (E) between source texels (S) and reconstructed texels (O).

It shall be noted that the steps (a), (b) and (c) are repeated for all of the decimated weights. The decimated weight is incremented and the steps (a), (b) and (c) are repeated until the color stops decreasing. Further, the decimated weight is decremented and the steps (a), (b) and (c) are repeated until the color stops decreasing. Furthermore, the modified decimated weights are updated in the place of original weights.

The color endpoint and weight refinement unit 114 can be configured to identify an efficient sampling in the ASTC encoder 100. The identification of the efficient sampling point is performed at a final stage of the color endpoint and weight refinement unit 114.

In an embodiment, the color endpoint and weight refinement unit 114 can be configured to perform one or more actions for refining weight indices in parallel. The one or more actions include determining whether a neighbor weight index is available for a weight index in a decimated weight grid. For example, the neighbor weight index is identified based on positions such as top left, top right, bottom left and bottom right of the weight index as given in the ASTC standard. In order to identify the neighbor weight index for the weight index, initially the weight indices which are located on top left, top right or the bottom right and bottom left weight indices should be refined. If it is identified that the top left, top right or the bottom right and bottom left weight indices are refined, then, for the weight index, the neighbor weight index can be identified.

Further, the one or more actions includes refining the neighbor weight index and the weight index in parallel, in response to determining that the neighbor weight index is available for the weight index.

In an exemplary embodiment, the color endpoint and weight refinement unit 114 includes various units for refining the weight indices in parallel. The various units of the color endpoint and weight refinement unit 114 are explained in conjunction with FIG. 2.

Figure 2:
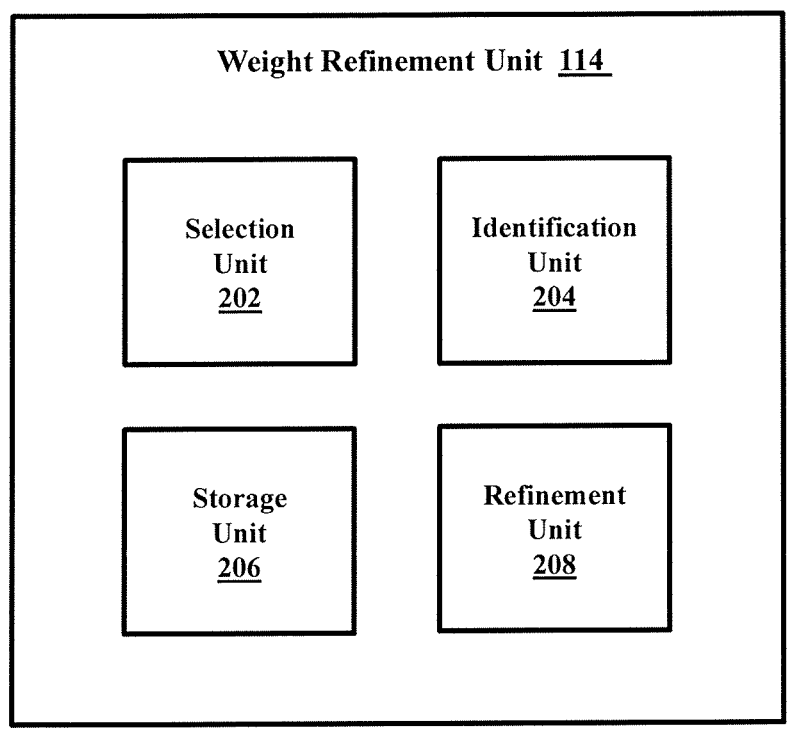
FIG. 2 is a schematic block diagram illustrating various units in a weight refinement unit in the ASTC encoder of FIG. 1.

FIG. 2 illustrates various units in a weight refinement unit 114 in the ASTC encoder as described in the FIG. 1, according to an exemplary embodiment of the present inventive concept. In an exemplary embodiment, the color endpoint and weight refinement unit 114 includes a selection unit 202, an identification unit 204, a storage unit 206, and a refinement unit 208.

In an exemplary embodiment, the selection unit 202 can be configured to select the weight index in the decimated weight grid for refinement.

In an exemplary embodiment, the identification unit 204 can be configured to identify the neighbor weight index for the weight index. The identification unit 204 can be configured to identify the neighbor weight index by identifying positions such as top left, top right, bottom left and bottom right of the neighbor weight index. In order to identify the neighbor weight index for the weight index, initially the weight indices which are located on top left, top right or the bottom right and bottom left should be refined. If it is identified that the top left, top right or the bottom right and bottom left weight indices are refined, then, for the weight index, the neighbor weight index can be identified.

In an embodiment, the storage unit 206 can be configured to store a weight indices sequence. For example, the weight indices sequence includes the weight index and the neighbor weight index which can be refined in parallel. If it is determined that the weight indices 2 and 5 of FIG. 5B or 5D, for example, can be refined in parallel, then the weight indices sequence includes the sequence as 2 and 5. In an embodiment, the storage unit 206 can be configured to store the weight indices sequence in a look-up table. The storage unit 106 may include one or more computer-readable storage media. The storage unit 106 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories, for example. In addition, the storage unit 106 may, in some examples, be considered a non-transitory storage medium. The term "non-transitory" may indicate that the storage medium is not embodied in a carrier wave or a propagated signal. However, the term "non-transitory" should not be interpreted that the storage unit 106 is non-movable. In some examples, the storage unit 106 can be configured to store larger amounts of information than the memory. In certain examples, a non-transitory storage medium may store data that can, over time, change (e.g., in Random Access Memory (RAM) or cache).

In an embodiment, the refinement unit 208 can be configured to receive the weight indices sequence from the storage unit 206. Further, the refinement unit 208 can be configured to refine the weight index and the neighbor weight index in parallel based on the weight indices sequence received from the storage unit 206.

FIG. 2 shows a limited overview of the weight refinement unit 114, but it is to be understood that other embodiments are not limited thereto. The labels or names of the units are used only for illustrative purpose and do not limit the scope of the present inventive concept. Further, the weight refinement unit 114 can include any number of units or sub-units communicating among each other along with the other components. Likewise, the functionalities of each unit can be combined by a single unit or can be distributed among each other in a manner different than described herein without departing from the scope of the present inventive concept.

Figure 3:
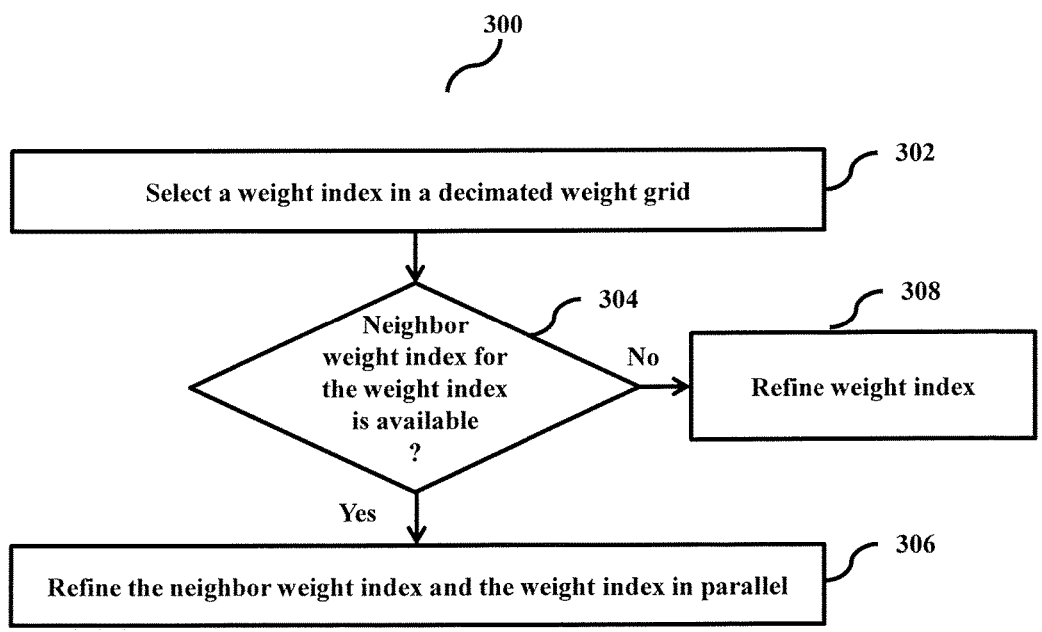
FIG. 3 is a flow chart diagram illustrating a method of providing parallel encoding of weight refinement in the ASTC encoder of FIG. 1.

FIG. 3 is a flow chart illustrating a method 300 of providing a parallel encoding of weight refinement in the ASTC encoder, according to an exemplary embodiment as disclosed herein. At step 302, the method 300 includes selecting a weight index in a decimated weight grid. The method 300 allows the weight refinement unit 114 to select the weight index in the decimated weight grid. In an embodiment, the selection unit 202 selects the weight index present in each row of the decimated weight grid for refinement.

At step 304, the method 300 includes determining whether the neighbor weight index for the weight index is available. The method 300 allows the weight refinement unit 114 to determine whether a neighbor weight index for the weight index is available. In order to identify the neighbor weight index for the weight index, initially the weight indices which are located on top left, top right or the bottom right and bottom left should be refined. If it is identified that the top left, top right or the bottom right and bottom left weight indices are refined, then, for the weight index, the neighbor weight index can be identified. If it is determined that the neighbor weight index for the weight index is available in the decimated weight grid at step 304 then, at step 306, the method 300 includes refining the neighbor weight index and the weight index in parallel. Thus, the method 300 allows the weight refinement unit 114 to refine the neighbor weight index and the weight index in parallel.

After receiving the selected weight index from the selection unit 202, the identification unit 204 determines the availability of the neighbor weight index for the selected weight index.

The neighbor weight index is identified based on a mechanism disclosed in the ASTC specification. If the neighbor weight index is available for the selected weight index, then both the neighbor weight index and the weight index will be refined in parallel in accordance with the present inventive concept.

If it is determined that the neighbor weight index for the weight index is unavailable in the decimated weight grid at step 304, then at step 308, the method 300 includes refining only the weight index. The method 300 allows the weight refinement unit 114 to refine the weight index. When there is no neighbor weight index available for the weight index in the decimated weight grid, then the refinement unit 114 refines only the selected weight index.

The various actions, acts, blocks, steps, or the like in the method 300 may be performed in the order presented, in a different order, or simultaneously, without limitation. Further, in some embodiments, some of the actions, acts, blocks, steps, or the like may be omitted, added, modified, skipped, or the like without departing from the scope of the present inventive concept.

Figure 4:
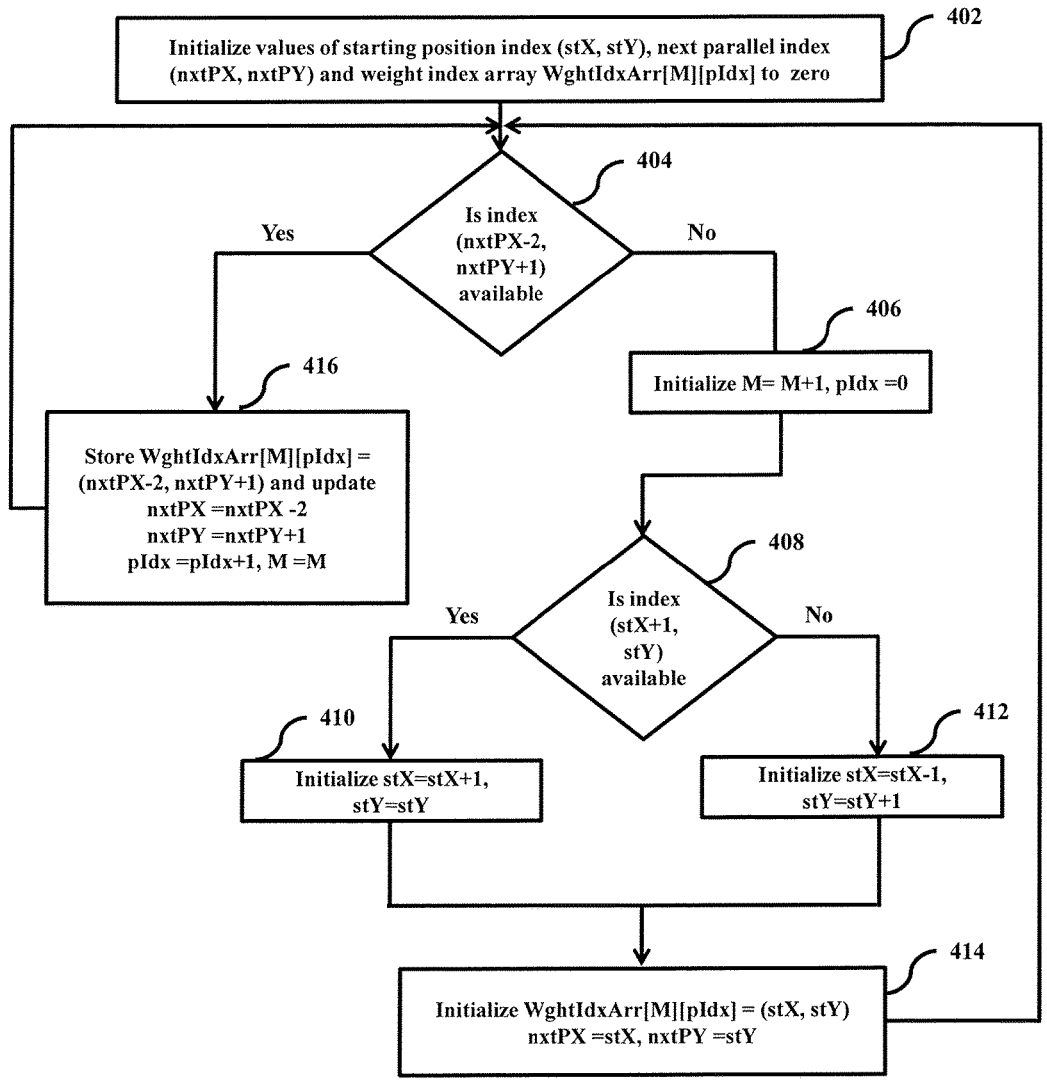
FIG. 4 is a flow chart diagram illustrating a method for identifying the neighbor weight index in the ASTC encoder of FIG. 1.

FIG. 4 is a flow chart illustrating a method 400 for identifying the neighbor weight index, according to an exemplary embodiment as disclosed herein. Prior to describing the flow chart, the notations used in the flow chart are described herein.

(stX, stY) denotes start position index of weight grid, which is initialized to (0,0).
(nxtPX, nxtPY) denotes next parallel weight index, which is initialized to (0,0).
WghtIdxArr denotes a two-dimensional matrix which has M rows and pIdx coloumns, where each row will be filled with weight indices that can be executed in parallel using store index pIdx.

At step 402, the method 400 includes initializing values of the starting position index (stX, stY), next parallel index (nxtPX, nxtPY) and weight index array WghtIdxArr[M][pIdx] to zero (0,0). The method 400 allows the weight refinement unit 114 to initialize values of the starting position index (stX, stY), next parallel index (nxtPX, nxtPY) and weight index array WghtIdxArr[M][pIdx] to zero.

At step 404, the method 400 includes determining whether the index (nxtPX−2, nxtPY+1) is available in the decimated grid array. The method 400 allows the weight refinement unit 114 to determine whether the index (nxtPX−2, nxtPY+1) is available in the decimated grid array.

If it is determined that the index (nxtPX−2, nxtPY+1) is unavailable in the decimated grid array at step 404 then, at step 406, the method 40 includes initializing M=M+1 and pIdx=0. The method 400 allows the weight refinement unit 114 to initialize M=M+1 and pIdx=0.

At step 408, the method 400 includes determining whether the index (stX+1, stY) is available. The method 400 allows the weight refinement unit 114 to determine whether the index (stX+1, stY) is available. If it is determined that the index (stX+1, stY) is available at step 408 then, at step 410, the method 400 includes initializing stX=stX+1, stY=stY. The method 400 allows the weight refinement unit 114 to initialize stX=stX+1, stY=stY.

At step 414, the method 400 includes initializing WghtIdxArr[M] [pIdx]=(stX, stY) and nxtPX=stX, nxtPY=stY. The method 400 allows the weight refinement unit 114 to initialize WghtIdxArr[M][pIdx]=(stX, stY) and nxtPX=stX, nxtPY=stY.

If it is determined that the index (stX+1, stY) is unavailable at step 408 then, at step 412, the method 400 includes initializing stX=stX−1, stY=stY+1. The method allows the weight refinement unit to initialize stX=stX−1, stY=stY+1. At step 414, the method 400 includes initializing WghtIdxArr[M][pIdx]=(stX, stY) and nxtPX=stX, nxtPY=stY. The method 400 allows the weight refinement unit 114 to initialize WghtIdxArr[M] [pIdx]=(stX, stY), nxtPX=stX and nxtPY=stY. After step 414, the method 400 loops back to the step 402 as shown in FIG. 4.

If it is determined that the index (nxtPX−2, nxtPY+1) is available in the decimated grid array at step 416 then, at step 406, the method 40 includes storing the index (nxtPX−2, nxtPY+1) in WghtIdxArr[M][pIdx] and update next parallel weight index as nxtPX=nxtPX−2, nxtPY=nxtPY+1, pIdx=pIdx+1 and M=M. The method allows the weight refinement unit 114 to store the index (nxtPX−2, nxtPY+1) in WghtIdxArr[M][pIdx] and update, next parallel weight index as nxtPX=nxtPX−2, nxtPY=nxtPY+1, pIdx=pIdx+1 and M=M. After the step 416, the method 400 loops back to the step 402 as shown in the FIG. 4.

The various actions, acts, blocks, steps, or the like in the method 400 may be performed in the order presented, in a different order, or simultaneously, without limitation. Further, in some embodiments, some of the actions, acts, blocks, steps, or the like may be omitted, added, modified, skipped, or the like without departing from the scope of the present inventive concept.

FIGS. 5A-5D show example illustrations of decimated weight grids in which the weight indices are refined in parallel, according to exemplary embodiments as disclosed herein.

Figure 5A:
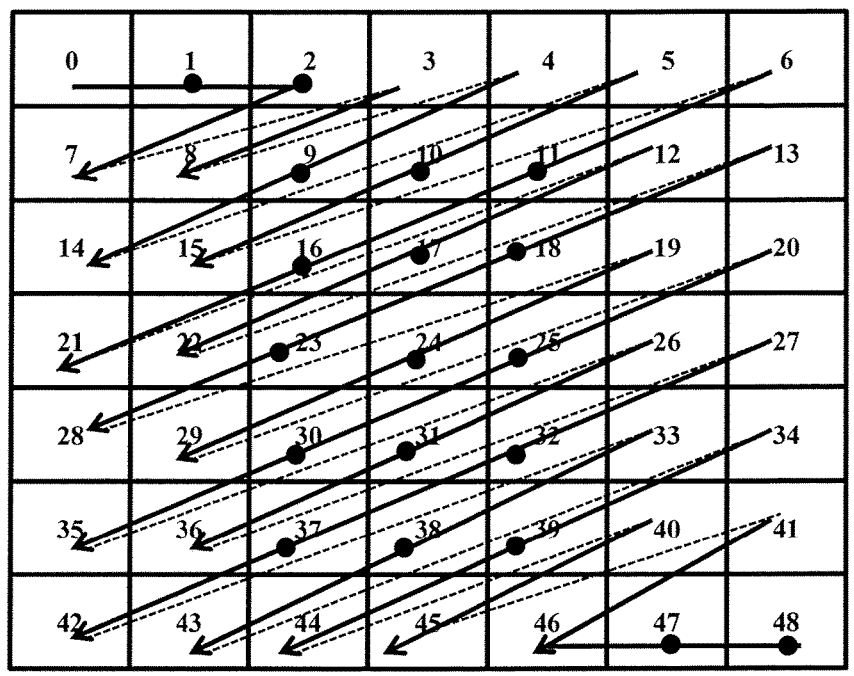
FIGS. 5A-5D are schematic diagrams of decimated weight grids in which the weight indices are refined in parallel in the ASTC encoder of FIG. 1.

In the FIG. 5A, the decimated grid size is 7×7. The selection unit 202 initially selects the weight index '0'. The identification unit 204 determines whether there is any neighbor weight index available for the weight index '0'. Here, the identification unit 204 identifies that there is no neighbor weight index for the weight index '0'. The refinement unit 208 refines only the weight index '0'. After refining the weight index '0', the selection unit 202 selects the weight index '1'. The identification unit 204 determines whether there is any neighbor weight index available for the weight index '1'. As the weight index '1' has no neighbor weight index, the refinement unit 208 refines the weight index '1'. Further, the selection unit 202 selects the weight index '2'. The identification unit 204 identifies the weight index '7' as the neighbor weight index to the weight index '2'. It should be noted that the neighbor weight index '7' is identified as the neighbor weight index, since, the weight index '7' has the top right index as '0' and top left index as '1', which are refined in the earlier clock cycles. Thus, the identification unit 204 identifies the weight index '7' as the neighbor weight index for the weight index '2'.

When the neighbor weight index '7' is identified for the selected index '2', the refinement unit 208 refines the weight indices '2' and '7' in parallel. In a similar manner, for each weight index in the decimated grid size (other than the weight index '0' and '1'), neighbor weight indices are identified. After identifying neighbor weight indices for a selected weight index, the refinement unit 208 refines the selected weight index and the neighbor weight indices in parallel.

Table 1 (provided below) depicts the weight indices which are refined in parallel. It should be understood that the weight indices 0, 1, 47 and 48 are refined individually and the remaining weight indices are refined in parallel in different clock cycles. From the Table 1, it can be inferred that the weight indices '0' and '1' are refined in clock cycle 0 and clock cycle 1, respectively. The different clock cycles and the weight indices which are refined in those clock cycles are summarized in the Table 1.

TABLE 1

| Clock Cycles | Weight Indices Sequence |
| --- | --- |
| Clock Cycle 0 | 0 |
| Clock Cycle 1 | 1 |
| Clock Cycle 0 | 2, 7 |
| Clock Cycle 1 | 3, 8 |
| Clock Cycle 2 | 4, 9, 14 |
| Clock Cycle 3 | 5, 10, 15 |
| Clock Cycle 4 | 6, 11, 16, 21 |
| Clock Cycle 5 | 12, 17, 22 |
| Clock Cycle 6 | 13, 18, 23, 28 |
| Clock Cycle 7 | 19, 24, 29 |
| Clock Cycle 8 | 20, 25, 30, 35 |
| Clock Cycle 9 | 26, 31, 36 |
| Clock Cycle 10 | 27, 32, 37, 42 |
| Clock Cycle 11 | 33, 38, 43 |
| Clock Cycle 12 | 34, 39, 44 |
| Clock Cycle 13 | 40, 45 |
| Clock Cycle 14 | 41, 46 |
| Clock Cycle 15 | 47 |
| Clock Cycle 16 | 48 |

It should be noted that, for a four-stage internal pipeline of a single core engine, the number of clock cycles taken to refine a decimated weight array of size 7×7 using a raster scan approach consumes 196 clock cycles (7×7×4) to complete weight refinement. For raster scan approach, only one stage will be active at a given cycle. This leads to an in-efficient system in terms of its operational performance. The present weight indices sequence for an example of a 7×7 weight array, allows that the indices sequence will be 0,1,2,7,3,8,4,9,14,5,10,15,6,11,16, 21 and so on. A distinction can be made here. In order to refine the weight index 7, since index 0 and 1 are already refined, index 7 can be fed into the pipeline without having any gap or void. Similarly, the weight indices 3 and 8 can be sequenced consecutively. By analogy, the weight indices 4, 9, 14 can be processed in consecutive cycles. In the present method, since the refinement starts with processing one index extra in the horizontal direction, while coming down in the modified Zig-Zag pattern, all the depending indexes are already processed, so the next index is ready to be processed in the next cycle. Thus, the presently disclosed method results in achieving high throughput. With the presently disclosed method, it should be noted that, for a weight array 7×7 and an internal pipeline of four stages, it will take up a total of 82 cycles. In contrast, the raster scan method would have taken 196 cycles and the usual Zig-Zag method would have taken 186 cycles.

Figure 5B:
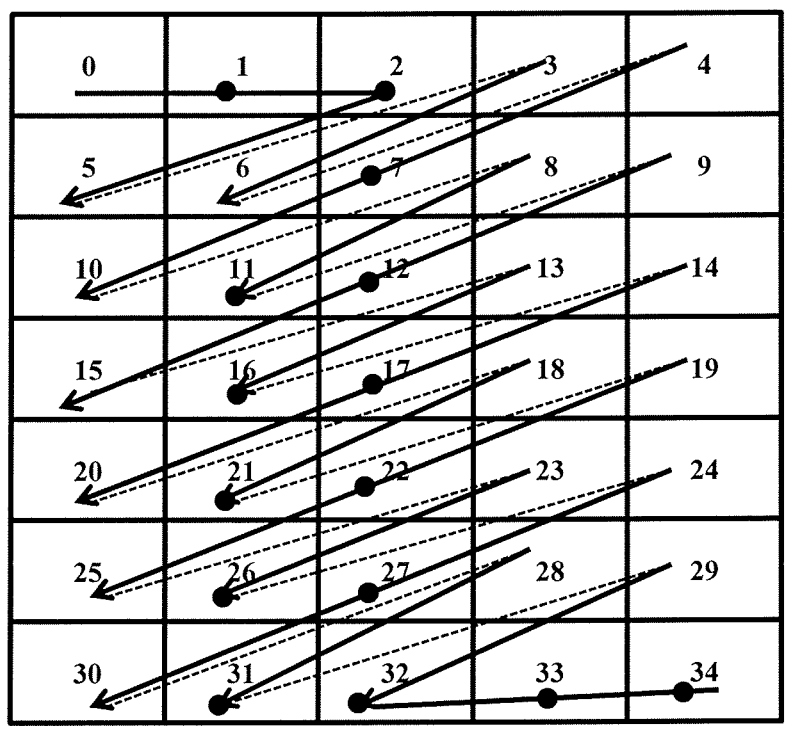

In the FIG. 5B, the decimated grid size is 5×7. The selection unit 202 initially selects the weight index '0'. The identification unit 204 determines whether there is any neighbor weight index available for the weight index '0'. In result, the identification unit 204 identifies that there is no neighbor weight index for the weight index '0'. The refinement unit 208 refines only the weight index '0'. After refining the weight index '0', the selection unit 202 selects the weight index '1'. The identification unit 204 determines whether there is any neighbor weight index available for the weight index '1'. In result, the identification unit 204 identifies that there is no neighbor weight index for weight index '1'. The refinement unit 208 refines only the weight index '1'. Further, the selection unit 202 selects the weight index '2'. The identification unit 204 identifies the weight index '5' as the neighbor weight index to the weight index '2'. It should be noted that the neighbor weight index '5' is identified as the neighbor weight index, since, the weight index '5' has the top right index as '0' and top left index as '1', which are refined in the earlier clock cycles. Thus, the identification unit 204 identifies the weight index '5' as the neighbor weight index for the weight index '2'.

When the neighbor weight index '5' is identified for the selected index '2', the refinement unit 208 refines the weight indices '2' and '5' in parallel. In a similar manner, for each weight index in the decimated grid size (other than the weight index '0' and '1'), neighbor weight indices are identified. After identifying neighbor weight indices for a selected weight index, the refinement unit 208 refines the selected weight index and the neighbor weight indices in parallel.

The Table 2 depicts the weight indices which are refined in parallel. It should be understood that the weight indices 0, 1, 33 and 34 are refined individually and the remaining weight indices are refined in parallel in subsequent clock cycles. From the Table 5B, it can be inferred that the weight indices '0' and '1' are refined in clock cycle 0 and clock cycle 1 respectively. The different clock cycles and the weight indices which are refined in those clock cycles are summarized in the Table 2.

TABLE 2

| Clock Cycles | Weight Indices Sequence |
| --- | --- |
| Clock Cycle 0 | 0 |
| Clock Cycle 1 | 1 |
| Clock Cycle 0 | 2, 5 |
| Clock Cycle 1 | 3, 6 |
| Clock Cycle 2 | 4, 7, 10 |
| Clock Cycle 3 | 8, 11 |
| Clock Cycle 4 | 9, 12, 15 |
| Clock Cycle 5 | 13, 16 |
| Clock Cycle 6 | 14, 17, 20 |
| Clock Cycle 7 | 18, 21 |
| Clock Cycle 8 | 19, 22, 25 |
| Clock Cycle 9 | 23, 26 |
| Clock Cycle 10 | 24, 27, 30 |
| Clock Cycle 11 | 28, 31 |
| Clock Cycle 12 | 29, 32 |
| Clock Cycle 13 | 33 |
| Clock Cycle 14 | 34 |

Figure 5C:
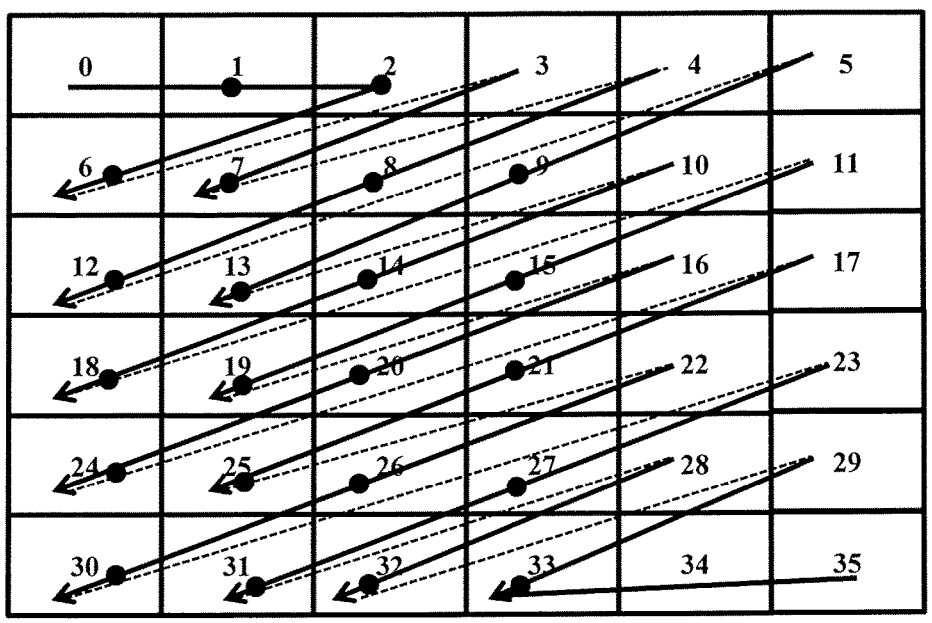

In the FIG. 5C, the decimated grid size is 6×6. The selection unit 202 initially selects the weight index '0'. The identification unit 204 determines whether there is any neighbor weight index available for the weight index '0'. In result, the identification unit 204 identifies that there is no neighbor weight index for the weight index '0'. The refinement unit 208 refines only the weight index '0'. After refining the weight index '0', the selection unit 202 selects the weight index '1'. The identification unit 204 determines whether there is any neighbor weight index available for the weight index '1'. In result, the identification unit 204 identifies that there is no neighbor weight index for the weight index '1'. The refinement unit 208 refines only the weight index '1'. Further, the selection unit 202 selects the weight index '2'. The identification unit 204 identifies the weight index '6' as the neighbor weight index to the weight index '2'. It should be noted that the neighbor weight index '6' is identified as the neighbor weight index, since, the neighbor weight index '6' has the top left index as '0' and top right index as '1', which are refined in the earlier clock cycles. Thus, the identification unit 204 identifies the weight index '5' as the neighbor weight index for the weight index '2'.

When the neighbor weight index '6' is identified for the selected index '2', the refinement unit 208 refines the weight indices '2' and '5' in parallel. In a similar manner, for each weight index in the decimated grid size (other than the weight index '0' and '1'), neighbor weight indices are identified. After identifying neighbor weight indices for a selected weight index, the refinement unit 208 refines the selected weight index and the neighbor weight indices in parallel.

The Table 3 (mentioned below) depicts the weight indices which are refined in parallel. It should be understood that the weight indices 0, 1, 34 and 35 are refined individually and the remaining weight indices are refined in parallel in different clock cycles. From the Table 3, it can be inferred that the weight indices 0 and 1 are refined in clock cycle 0 and clock cycle 1 respectively. The different clock cycles and the weight indices which are refined in those clock cycles are summarized in the Table 3.

TABLE 3

| Clock Cycles | Weight Indices Sequence |
| --- | --- |
| Clock Cycle 0 | 0 |
| Clock Cycle 1 | 1 |
| Clock Cycle 0 | 2, 6 |
| Clock Cycle 1 | 3, 7 |
| Clock Cycle 2 | 4, 8, 12 |
| Clock Cycle 3 | 5, 9, 13 |
| Clock Cycle 4 | 10, 14, 18 |
| Clock Cycle 5 | 11, 15, 19 |
| Clock Cycle 6 | 16, 20, 24 |
| Clock Cycle 7 | 17, 21, 25 |
| Clock Cycle 8 | 22, 26, 30 |
| Clock Cycle 9 | 23, 27, 31 |
| Clock Cycle 10 | 28, 32 |
| Clock Cycle 11 | 29, 33 |
| Clock Cycle 12 | 34, 35 |

Figure 5D:
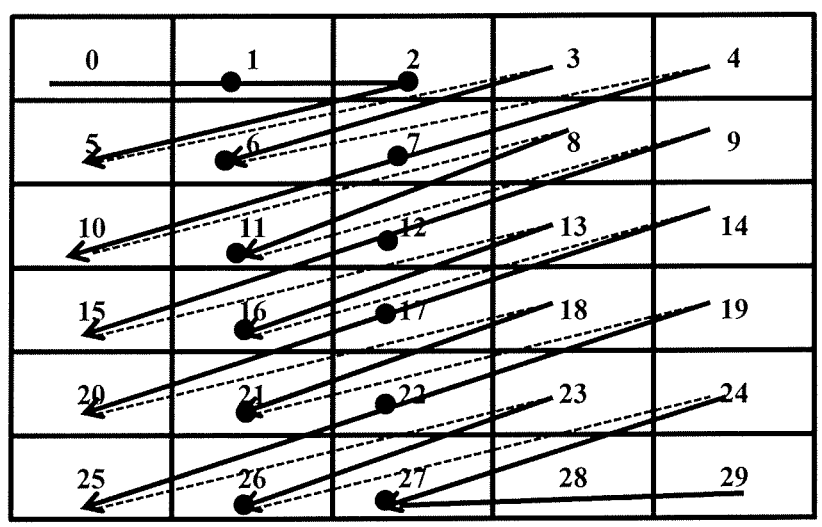

In FIG. 5D, the decimated grid size is 5×6. The selection unit 202 selects the weight index '0'. The identification unit 204 determines whether there is any neighbor weight index available for the weight index '0'. In result, the identification unit 204 identifies that there is no neighbor weight index for the weight index '0'. The refinement unit 208 refines only the weight index '0'. After refining the weight index '0', the selection unit 202 selects the weight index '1'. The identification unit 204 determines whether there is any neighbor weight index available for the weight index '1'. In result, the identification unit 204 identifies that there is no neighbor weight index for the weight index '1' The refinement unit 208 refines only the weight index '1'.

Further, the selection unit 202 selects the weight index '2'. The identification unit 204 identifies the weight index '6' as the neighbor weight index to the weight index '2'. It should be noted that the neighbor weight index '6' is identified as the neighbor weight index, since, the neighbor weight index '6' has the top left index as '0' and top right index as '1', which are refined in the earlier clock cycles. Thus, the identification unit 204 identifies the weight index '5' as the neighbor weight index for the weight index '2'.

When the neighbor weight index '6' is identified for the selected index '2', the refinement unit 208 refines the weight indices '2' and '5' in parallel. In a similar manner, for each weight index in the decimated grid size (other than the weight index '0' and '1'), neighbor weight indices are identified. After identifying neighbor weight indices for a selected weight index, the refinement unit refines the selected weight index and the neighbor weight indices in parallel.

Table 4 depicts the weight indices which are refined in parallel. It should be understood that the weight indices 0, 1, 28 and 29 are refined individually and the remaining weight indices are refined in parallel in different clock cycles. From Table 4, it can be inferred that the weight indices 0 and 1 are refined in clock cycle 0 and clock cycle 1, respectively. The different clock cycles and the weight indices which are refined in those clock cycles are summarized in the Table 4.

TABLE 4

| Clock Cycles | Weight Indices Sequence |
| --- | --- |
| Clock Cycle 0 | 0 |
| Clock Cycle 1 | 1 |
| Clock Cycle 0 | 2, 5 |
| Clock Cycle 1 | 3, 6 |
| Clock Cycle 2 | 4, 7, 10 |
| Clock Cycle 3 | 8, 11 |
| Clock Cycle 4 | 9, 12, 15 |
| Clock Cycle 5 | 13, 16 |
| Clock Cycle 6 | 14, 17, 20 |
| Clock Cycle 7 | 18, 21 |
| Clock Cycle 8 | 19, 22, 25 |
| Clock Cycle 9 | 23, 26 |
| Clock Cycle 10 | 24, 27 |
| Clock Cycle 11 | 28 |
| Clock Cycle 12 | 29 |

Figure 6:
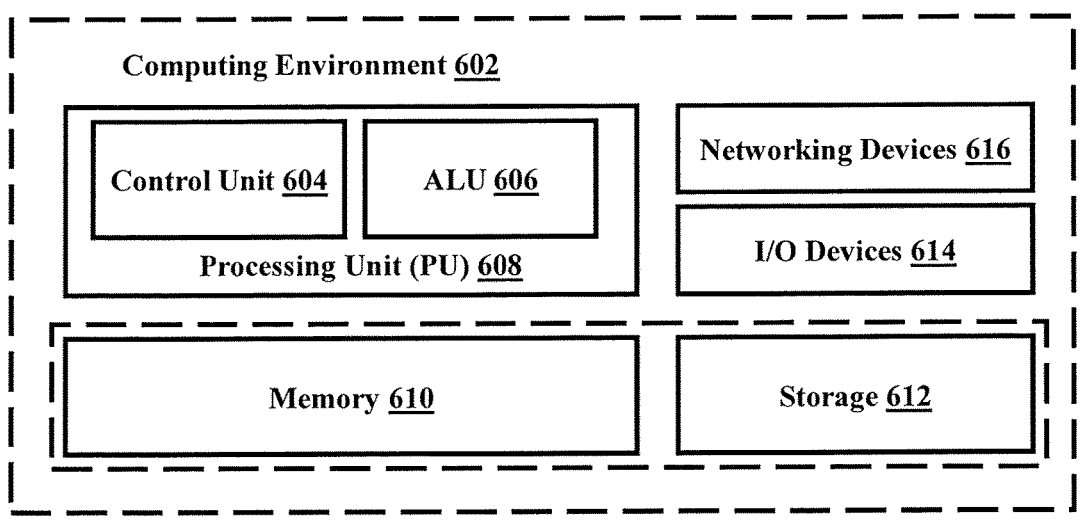
FIG. 6 is a schematic block diagram of a computing environment implementing the method of providing parallel encoding of weight refinement in the ASTC encoder of FIG. 1.

FIG. 6 illustrates a computing environment implementing the method of providing parallel encoding of weight refinement in the ASTC encoder, according to an exemplary embodiment as disclosed herein. As depicted, the computing environment 602 comprises at least one processing unit 608 that is equipped with a control unit 604 and an Arithmetic Logic Unit (ALU) 606, a memory 610, a storage unit 612, a plurality of networking devices 616 and a plurality of Input output (I/O) devices 614. The processing unit 608 is responsible for processing the instructions of the schemes. The processing unit 608 receives commands from the control unit in order to perform its processing. Further, any logical and arithmetic operations involved in the execution of the instructions are computed with the help of the ALU 606.

The overall computing environment 602 can be composed of multiple homogeneous and/or heterogeneous cores, multiple CPUs of different kinds, special media and other accelerators, without limitation. The processing unit 608 is responsible for processing the instructions of the scheme. Further, the plurality of processing units 608 may be located on a single chip or over multiple chips.

The algorithm comprising instructions and codes required for the implementation are stored in either the memory unit 610 or the storage 612, or both. At the time of execution, the instructions may be fetched from the corresponding memory 610 and/or storage 612, and executed by the processing unit 608.

In case of any hardware implementations various networking devices 616 or external I/O devices 614 may be connected to the computing environment to support the implementation through the networking unit and the I/O device unit.

The exemplary embodiments disclosed herein can be implemented through at least one software program running on at least one hardware device and performing network management functions to control the elements. The elements shown in FIGS. 1 and 6 include blocks which can be at least one of a hardware device, or a combination of hardware devices and software modules.

The foregoing description of exemplary embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed inventive concept. It is to be understood that the phraseology or terminology employed herein is for the purpose of description and not of limitation. Therefore, while the embodiments herein have been described in terms of preferred embodiments, those of ordinary skill in the pertinent art will recognize that various embodiments of the present inventive concept as disclosed herein can be practiced with modification within the spirit and scope of the exemplary embodiments as described herein.

We claim:

1. A method of providing parallel encoding of weight refinement in an adaptive scalable texture compression (ASTC) encoder, the method comprising:
   determining, by a weight refinement unit, whether a neighbor weight index is available for a weight index in a decimated weight grid; and
   in response to determining that said neighbor weight index is available for said weight index, refining, by said weight refinement unit, said neighbor weight index and said weight index in parallel.

2. The method of claim 1, wherein refining said neighbor weight index and said weight index in parallel comprises:
   generating a weight indices sequence with said neighbor weight index and said weight index.

3. The method of claim 2, further comprising:
   storing the weight indices sequence in at least one of a look-up table or a buffer.

4. The method of claim 1, said determining comprising:
   identifying said neighbor weight index based on at least one position relative to said weight index within the decimated weight grid.

5. The method of claim 4, wherein said at least one position is located on a top left, top right, bottom left, or bottom right of said weight index within the decimated weight grid.

6. The method of claim 4, wherein said neighbor weight index at said position within the decimated weight grid is refined in parallel with said weight index.

7. An Advanced Scalable Texture Compression (ASTC) encoder for parallel encoding of weight refinement, the ASTC encoder comprising a weight refinement unit configured for:
   determining whether a neighbor weight index is available for a weight index in a decimated weight grid; and
   in response to determining that said neighbor weight index is available for said weight index, refining said neighbor weight index and said weight index in parallel.

8. The ASTC encoder of claim 7, wherein said weight refinement unit is configured to refine said neighbor weight index and said weight index in parallel by:
   generating a weight indices sequence with said neighbor weight index and said weight index.

9. The ASTC encoder of claim 8, further comprising:
   a storage unit comprising at least one of a look-up table or a buffer configured for storing the weight indices sequence.

10. The ASTC encoder of claim 7, said determining comprising:
    identifying said neighbor weight index based on at least one position relative to said weight index within the decimated weight grid.

11. The ASTC encoder of claim 10, wherein said at least one position is located on a top left, top right, bottom left, or bottom right of said weight index within the decimated weight grid.

12. The ASTC encoder of claim 10, wherein said neighbor weight index at said position within the decimated weight grid is refined in parallel with said weight index.

13. A computer program product comprising computer-executable program code recorded on a computer-readable non-transitory storage medium, said computer-executable program code when executed causing actions including:
    determining whether a neighbor weight index is available for a weight index in a decimated weight grid; and
    in response to determining that said neighbor weight index is available for said weight index, refining said neighbor weight index and said weight index in parallel.

14. The computer program product of claim 13, wherein said determining and said refining are performed by a weight refinement unit.

15. The computer program product of claim 13, wherein refining said neighbor weight index and said weight index in parallel comprises:
    generating a weight indices sequence with said neighbor weight index and said weight index.

16. The computer program product of claim 15, the computer-executable program code when executed causing the actions further includes:
    storing the weight indices sequence in at least one of a look-up table or a buffer.

17. The computer program product of claim 13, said determining comprising:
    identifying said neighbor weight index based on at least one position relative to said weight index within the decimated weight grid.

18. The computer program product of claim 17, wherein said at least one position is located on a top left, top right, bottom left, or bottom right of said weight index within the decimated weight grid.

19. The computer program product of claim 17, wherein said neighbor weight index at said position within the decimated weight grid is refined in parallel with said weight index.

* * * * *